US012589799B2

(12) United States Patent
Park

(10) Patent No.: US 12,589,799 B2
(45) Date of Patent: Mar. 31, 2026

(54) SPEED REDUCER AND INDEPENDENT STEERING SYSTEM INCLUDING THE SAME

(71) Applicants: Hyundai Motor Company, Seoul (KR); Kia Corporation, Seoul (KR)

(72) Inventor: Jeong Hwan Park, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 395 days.

(21) Appl. No.: 18/520,390

(22) Filed: Nov. 27, 2023

(65) Prior Publication Data

US 2025/0010912 A1 Jan. 9, 2025

(30) Foreign Application Priority Data

Jul. 3, 2023 (KR) ......................... 10-2023-0085446

(51) Int. Cl.
| | |
|---|---|
| *B62D 7/10* | (2006.01) |
| *B62D 7/22* | (2006.01) |
| *F16H 1/20* | (2006.01) |
| *F16H 1/48* | (2006.01) |

(52) U.S. Cl.
CPC .............. *B62D 7/10* (2013.01); *B62D 7/226* (2013.01); *F16H 1/20* (2013.01); *F16H 1/206* (2013.01); *F16H 1/48* (2013.01)

(58) Field of Classification Search
CPC .. B62D 7/10; B62D 7/226; F16H 1/20; F16H 1/206; F16H 1/48

USPC ................. 180/234, 408, 411–413, 443, 444
See application file for complete search history.

(56) References Cited

U.S. PATENT DOCUMENTS

| | | | |
|---|---|---|---|
| 2017/0225704 A1* | 8/2017 | Urushibata ............ | B62D 5/005 |
| 2019/0248233 A1 | 8/2019 | Calleja et al. | |
| 2021/0316604 A1 | 10/2021 | Tao et al. | |
| 2021/0380090 A1* | 12/2021 | Baer ....................... | F16D 65/18 |

FOREIGN PATENT DOCUMENTS

| | | |
|---|---|---|
| JP | 1993-263737 A | 10/1993 |
| JP | 2012-219908 A | 11/2012 |
| JP | 2022-047396 A | 3/2022 |
| KR | 2004-0006907 A | 1/2004 |
| KR | 2023-0008318 A | 1/2023 |

\* cited by examiner

*Primary Examiner* — Erick R Solis
(74) *Attorney, Agent, or Firm* — MORGAN, LEWIS & BOCKIUS LLP

(57) ABSTRACT

A speed reducer includes an input shaft configured to receive power from a drive portion, a gear unit fastened to the input shaft to receive the power from the drive portion through the input shaft, and an output shaft coupled to the gear unit and configured to transmit driving power, in which the gear unit includes a spur gear coupled to the input shaft, and a mounting gear positioned coaxially with the spur gear and coupled to the output shaft, and in which a rotation angle of the output shaft is decreased by minute deformation of the gear unit.

19 Claims, 7 Drawing Sheets

SPEED REDUCER AND INDEPENDENT STEERING SYSTEM INCLUDING THE SAME

CROSS-REFERENCE TO RELATED APPLICATION

The present application claims priority to Korean Patent Application No. 10-2023-0085446 filed on Jul. 3, 2023, the entire contents of which is incorporated herein for all purposes by this reference.

BACKGROUND OF THE PRESENT DISCLOSURE

Field of the Present Disclosure

The present disclosure relates to a speed reducer and an independent steering system including the same, and more particularly, to a speed reducer which is configured to implement understeering characteristics by providing a structure which is minutely deformed even when no external force is applied, and an independent steering system including the same.

Description of Related Art

In general, a speed reducer is connected directly or indirectly to a motor and serves to reduce a rotation speed of the motor while amplifying power, transmit power to a gear train, and rotate a driveshaft connected to the gear train, moving a vehicle. There is a small-scale speed reducer for a vehicle that utilizes a belt or a chain. However, in general, a gear-driven speed reducer, which is excellent in transmission efficiency and durability, is used, and a helical gear is applied to reduce vibration and noise.

In a power transmission system of the speed reducer, an input shaft is spline-coupled and connected to a motor, and a gear is provided at an external diameter side of the input shaft and coupled to an output gear. When power is transmitted to the output shaft, a gear provided at an external diameter side of the output shaft engages with a drive gear of a differential device so that power is transmitted to the differential device.

As described above, the speed reducer includes the input shaft, the output shaft, and a differential gear train and includes a structure in which first and second opposite end portions of each of the shafts are supported on a speed reducer casing by bearings. The input shaft is directly connected and coupled to the motor by spline teeth, receives power of the motor, and provides the output shaft, which is an intermediate connection gear, with a rotation force amplified by a gear ratio. The output gear provides the drive gear of the differential device with a rotation force amplified by a gear ratio.

Furthermore, recently, as vehicles having structures symmetric in a leftward/rightward direction and a forward/rearward direction, vehicles having completely symmetric shapes, which operate by independent steering systems fastened to the vehicles, have been developed. The completely symmetric vehicle is greatly advantageous in providing a wide space.

However, in the case of the completely symmetric vehicle, neutral steering of the vehicle occurs with respect to a gravity center point during a steering operation, which causes a problem in which a yaw motion of the vehicle consistently occurs during the steering operation.

Therefore, there is a demand for an effort to ensure a neutral steering driving propensity, which includes the same characteristics as a steering vehicle with an understeering propensity, by applying compliance steering to the symmetric vehicle by a configuration between internal gears that form an independent corner module including the speed reducer.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a speed reducer configured for generating minute deformation between low-level components that form the speed reducer.

The present disclosure has been made in an effort to provide a structure for inducing minute deformation of a speed reducer by providing a structure for changing a shape of a spur gear and a shape of a mounting gear positioned coaxially with the spur gear.

The objects of the present disclosure are not limited to the above-mentioned objects, and other objects of the present disclosure, which are not mentioned above, may be understood from the following descriptions and more clearly understood from the exemplary embodiment of the present disclosure. Furthermore, the objects of the present disclosure may be realized by means defined in the claims and a combination thereof.

To achieve the above-mentioned objects of the present disclosure, a speed reducer includes the following configurations.

In one aspect, the present disclosure provides the speed reducer including: an input shaft configured to receive power from a drive portion: a gear unit fastened to the input shaft to receive the power from the drive portion through the input shaft; and an output shaft coupled to the gear unit and configured to transmit driving power, in which the gear unit includes: a spur gear coupled to the input shaft; and a mounting gear positioned coaxially with the spur gear and coupled to the output shaft.

In an exemplary embodiment, the spur gear may include at least two holes symmetric with respect to a center shaft connecting the spur gear and the mounting gear.

In another exemplary embodiment of the present disclosure, the spur gear may further include: a rod portion fastened to a center shaft of the mounting gear; and stoppers positioned on a surface of the mounting gear so that first and second opposite end portions of the rod portion are fastened to the stoppers.

In yet another exemplary embodiment of the present disclosure, the mounting gear may include: a bushing portion including an internal side fixed to a center shaft of the mounting gear, and an external side configured to adjoin an internal peripheral surface of the mounting gear.

In yet another exemplary embodiment of the present disclosure, the bushing portion may be made of a high-hardness rubber material.

In still yet another exemplary embodiment of the present disclosure, the bushing portion may include one or more bushing holes provided at the same interval based on the center shaft.

In a further exemplary embodiment of the present disclosure, the mounting gear may further include: a gasket hole formed in the mounting gear in two or more directions symmetric with respect to a center shaft of the mounting gear: a rubber gasket positioned in the gasket hole; and a shaft fixed to the center shaft of the mounting gear and including an extension portion corresponding to the gasket hole.

In another aspect, the present disclosure provides an independent steering system including: an upper arm including one end portion fastened to a vehicle body: a knuckle unit fastened to the upper arm: a steering input portion configured to input a steering angle of the knuckle unit; and a speed reducer fastened to the upper arm and positioned between the steering input portion and the knuckle unit, in which the speed reducer includes: an input shaft configured to apply power to the steering input portion: a gear unit including a spur gear coupled to the input shaft, and a mounting gear positioned coaxially with the spur gear and coupled to an output shaft; and the output shaft coupled to the gear unit and configured to transmit driving power.

In an exemplary embodiment of the present disclosure, the spur gear may include at least two holes symmetric with respect to a center shaft connecting the spur gear and the mounting gear.

In another exemplary embodiment of the present disclosure, the spur gear may further include: a rod portion fastened to a center shaft of the mounting gear; and stoppers positioned on a surface of the mounting gear so that first and second opposite end portions of the rod portion are fastened to the stoppers.

In yet another exemplary embodiment of the present disclosure, the mounting gear may include: a bushing portion including an internal side fixed to a center shaft of the mounting gear, and an external side configured to adjoin an internal peripheral surface of the mounting gear.

In yet another exemplary embodiment of the present disclosure, the bushing portion may be made of a high-hardness rubber material.

In still yet another exemplary embodiment of the present disclosure, the bushing portion may include one or more bushing holes provided at the same interval based on the center shaft.

In a further exemplary embodiment of the present disclosure, the mounting gear may further include: a gasket hole formed in the mounting gear in two or more directions symmetric with respect to a center shaft of the mounting gear; a rubber gasket positioned in the gasket hole; and a shaft fixed to the center shaft of the mounting gear and including an extension portion corresponding to the gasket hole.

In another further exemplary embodiment of the present disclosure, the shaft may include at least two extension portions symmetric with respect to the center shaft of the mounting gear.

The present disclosure may obtain the following effects from the above-mentioned present embodiment and configurations, engagements, and usage relationships to be described below.

The present disclosure provides an effect of providing the speed reducer for changing the steering characteristics of the vehicle through the minute deformation of the low-level structure of the speed reducer that generates the lateral force.

Furthermore, the present disclosure provides an effect of reducing costs by providing the independent steering system having the understeering characteristics through the speed reducer by generating the minute deformation by changing the shape of the spur gear and the shape of the mounting gear.

Other aspects and exemplary embodiments of the present disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
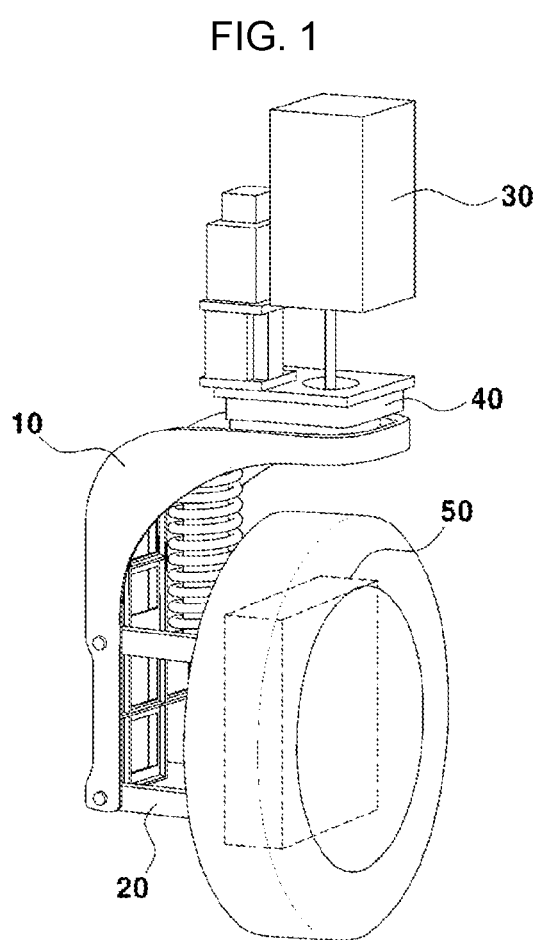
FIG. 1 is a view exemplarily illustrating a configuration of a speed reducer fastened to a steering system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter reference will now be made in detail to various embodiments of the present disclosure, examples of which are illustrated in the accompanying drawings and described below. While the present disclosure will be described in conjunction with exemplary embodiments of the present disclosure, it will be understood that present description is not intended to limit the present disclosure to those exemplary embodiments of the present disclosure. On the other hand, the present disclosure is directed to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in more detail with reference to the accompanying drawings. The exemplary embodiments of the present disclosure may be modified in various different forms, and it is not interpreted that the scope of the present disclosure is limited to the following embodiments. The exemplary embodiments are provided to more completely explain the present disclosure to those skilled in the art.

Furthermore, the term "unit", "part", "module", or the like, which is described in the specification, means a unit that is configured to perform at least one function or operation, and the "unit", "part", or the like may be implemented by hardware, software, or a combination of hardware and software.

Furthermore, the terms used in the present specification are used only for describing various exemplary embodiments and are not intended to limit the embodiments. Singular expressions include plural expressions unless clearly referred to as different meanings in the context.

Furthermore, in the present specification, names of constituent elements are classified as a first . . . , a second . . . , and the like to discriminate the constituent elements including the same name, and the names are not essentially limited to the order in the description below.

Hereinafter, the exemplary embodiments will be described in detail with reference to the accompanying drawings. In the description of the exemplary embodiments with reference to the accompanying drawings, the same or corresponding constituent elements are assigned with the same reference numerals regardless of reference numerals, and the repetitive description thereof will be omitted.

The present disclosure relates to a speed reducer 40. The present disclosure relates to the speed reducer 40, and an independent steering system including the speed reducer 40.

Furthermore, the independent steering system of the present disclosure is a single steering system coupled to each wheel. In the case of a multi-wheel vehicle, the independent steering system configured for independently performing a steering motion may be provided to each of the vehicle wheels. Furthermore, in the exemplary embodiment of the present disclosure, the vehicles mounted with the independent steering systems include a vehicle symmetric in a forward/rearward direction and a leftward/rightward direction, and the vehicle means a vehicle including neutral steering characteristics corresponding to a steering angle input in a state in which the speed reducer is not minutely deformed.

Hereinafter, the exemplary embodiments will be described in detail with reference to the accompanying drawings. In the detailed description with reference to the accompanying drawings, the same or corresponding constituent elements are assigned with the same reference numerals regardless of reference numerals, and the repetitive description thereof will be omitted.

The present disclosure relates to the independent steering system configured so that a knuckle unit 50 coupled to the wheel may rotate independently.

Moreover, the independent steering system of the present disclosure includes a structure which may be fastened to each of the wheels and perform the steering motion independently. The vehicle wheels mounted with the independent steering systems may be configured so that an external wheel includes a steering angle of 60 degrees, and an internal wheel includes a steering angle of 90 degrees.

FIG. 1 is a perspective view of the independent steering system including the speed reducer 40 according to the exemplary embodiment of the present disclosure.

The independent steering system of the present disclosure includes a lower arm 20 and an upper arm 10 positioned in a width direction of the vehicle. The independent steering system includes the knuckle unit 50 positioned between the lower arm 20 and the upper arm 10 and including an external surface to which the wheel is fastened. The upper arm 10 includes a structure fastened to an upper end portion of the knuckle unit 50, extending downwardly in a height direction, and fastened to the lower arm 20. The speed reducer 40 is provided at an upper end portion of the upper arm 10 and transmits driving power to the knuckle unit 50 when the driving power is applied from a steering input portion 30. The upper arm 10 fastened to an output shaft 42 of the speed reducer 40 rotates integrally with the knuckle unit 50 and rotates integrally with the output shaft 42 about the speed reducer 40.

In the exemplary embodiment of the present disclosure, the knuckle unit 50 is positioned to be fixed to the upper arm 10, and the upper arm 10 is configured to be fastened to the output shaft 42 of the speed reducer 40 so that the knuckle unit 50 may rotate integrally with the upper arm 10 about the output shaft 42, as a center shaft, in a forward/rearward direction of the vehicle.

Moreover, the independent steering system includes the steering input portion 30 fixed to a vehicle body and configured to be fastened to the upper end portion of the upper arm 10 so that a steering force is applied in response to a user's steering input. In the exemplary embodiment of the present disclosure, the steering input portion 30 may be configured as a steering motor configured to receive an electronic signal and change a steering angle of the knuckle unit 50. The steering input portion 30 may be positioned at the upper end portion of the upper arm 10 and fastened to the upper arm 10 by the speed reducer 40.

The lower arm 20 is provided at a lower end portion of the upper arm 10 and fastened to a lower end portion of the knuckle unit 50. One end portion of the lower arm 20 and the lower end portion of the knuckle unit 50 are coupled by a fastening unit. The fastening unit is configured to absorb forward and rearward motions and leftward and rightward motions applied from the wheel.

The fastening unit is provided adjacent to the lower end portion of the knuckle unit 50. In the exemplary embodiment of the present disclosure, a ball stud of the fastening unit may be inserted into the knuckle unit 50, and a pinch bolt or locking nut may be provided to integrally fix the knuckle unit 50 and the ball stud.

The independent steering system includes the speed reducer 40 positioned between the upper arm 10 and the steering input portion 30 and configured to be fastened to the upper end portion of the upper arm 10. An input shaft 41 of the speed reducer 40 is fastened to the driveshaft of the steering input portion 30, and the output shaft 42 fastened to the upper arm 10 is configured to apply the rotation force to the upper arm 10.

Figure 2A:
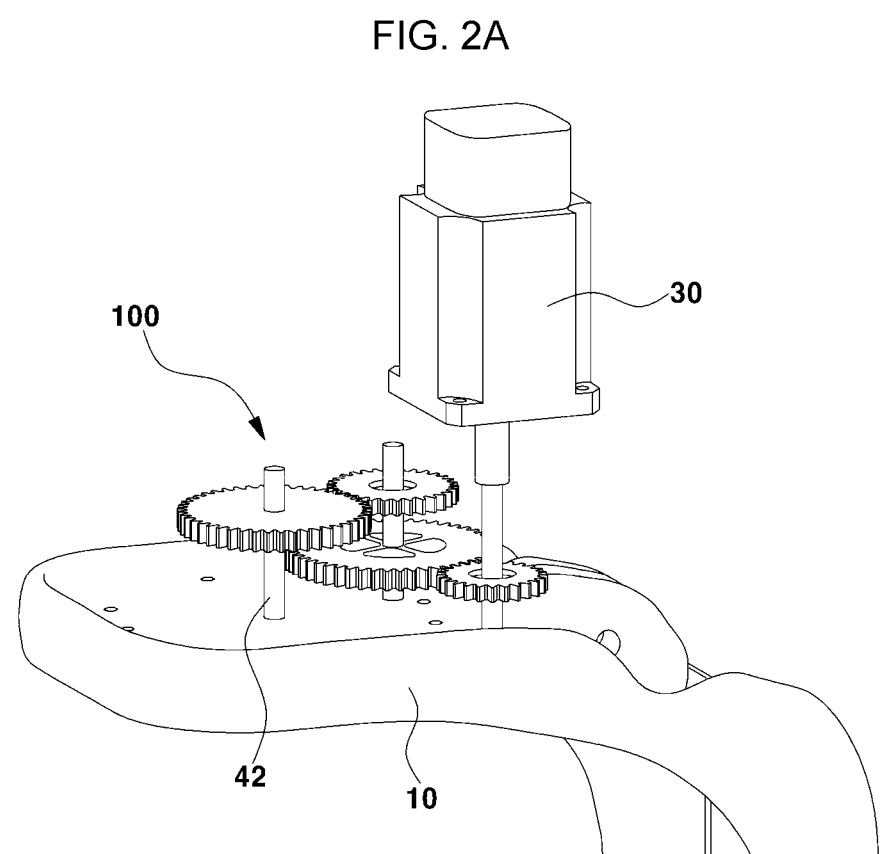
FIG. 2A is a configuration view of the speed reducer according to the exemplary embodiment of the present disclosure in a case in which driving power is applied to a steering input portion.
Figure 2B:
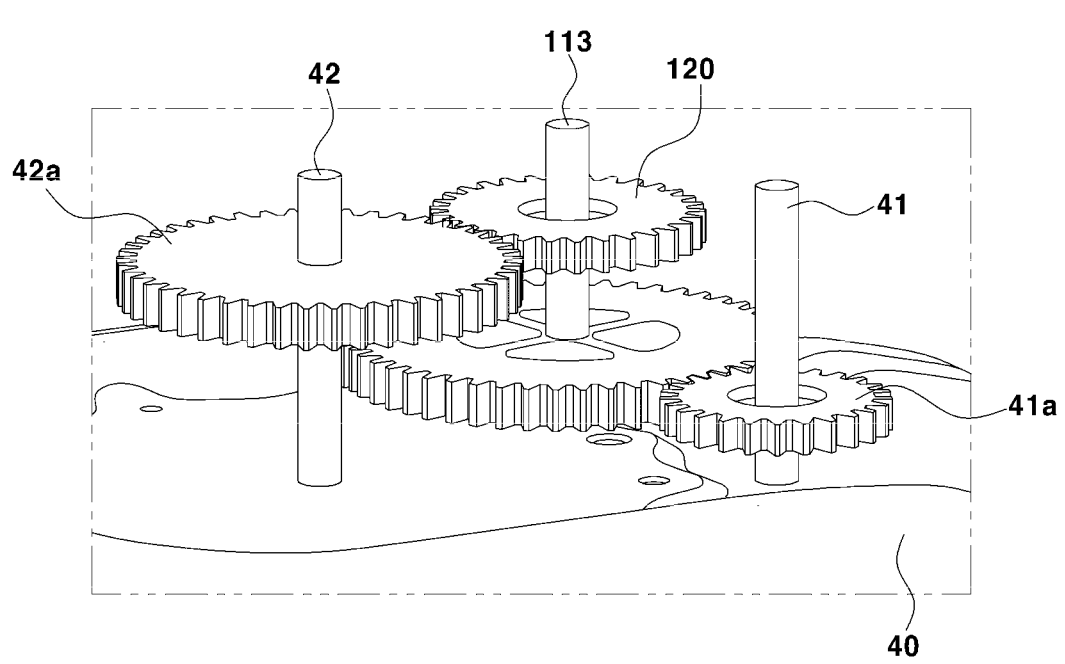
FIG. 2B is a configuration view of a gear unit according to the exemplary embodiment of the present disclosure.

FIG. 2A illustrates the speed reducer 40 fastened to the upper arm 10 and illustrates a motor as a component of the steering input portion 30, and FIG. 2B is a configuration view exemplarily illustrating the speed reducer 40.

The speed reducer 40 is positioned on an upper surface of the upper arm 10, and the input shaft 41 of the speed reducer 40 is configured as a driveshaft of the steering motor of the steering input portion 30. In the exemplary embodiment of the present disclosure, the upper arm 10 is positioned at the upper end portion of the knuckle unit 50 fastened to the wheel, and the upper arm 10 and the knuckle unit 50 are configured to rotate integrally. The upper arm 10 may be positioned adjacent to a lower surface of the speed reducer 40, and the upper arm 10 may be configured to rotate integrally with the output shaft 42 in response to the rotation force of the output shaft 42 of the speed reducer 40. That is, the upper arm 10 fastened to the output shaft 42 of the speed reducer 40 may be configured so that the knuckle unit 50 and the upper arm 10 rotate integrally about the output shaft 42 of the speed reducer 40.

The speed reducer 40 includes the input shaft 41 configured as the driveshaft of the motor, and a gear unit 100 fastened to receive the rotation force of the input shaft 41. The speed reducer 40 includes the output shaft 42 fastened to the gear unit 100 to transmit driving power so that the upper arm 10 rotates integrally with the knuckle unit 50.

The gear unit 100 includes a spur gear 110 gear-engaged to a gear 41a positioned on the input shaft 41, and a mounting gear 120 positioned coaxially with the spur gear 110 and coupled to the output shaft 42. Therefore, the driving power of the steering input portion 30 is inputted through the input shaft 41. When the gear 41a of the input shaft 41 rotates, the gear unit 100 transmits the driving power to the output shaft 42 in conjunction with the rotation of the gear 41a.

The gear unit 100 is configured to apply the power, which is applied through the input shaft 41, to the output shaft 42. The gear unit 100 is configured to be minutely deformed as the power is applied. That is, in an exemplary embodiment of the present disclosure in which at least one of the spur gear 110 and the mounting gear 120 is minutely deformed in comparison with a normal rotation angle of the output shaft 42 in case that the power is applied to the input shaft 41 without minute deformation, a rotation angle of the output shaft 42, which is outputted in response to the power applied through the input shaft 41, relatively decreases.

The spur gear 110 rotates inward in the height direction of the speed reducer 40 in the state in which the spur gear 110 is gear-engaged to the gear 41a of the input shaft 41. Moreover, the independent steering system includes the mounting gear 120 positioned coaxially with the spur gear 110 and gear-engaged to a gear 42a of the output shaft 42. In the instant case, the gear 41a, which is positioned on the input shaft 41, and the gear 42a, which is positioned on the output shaft 42, may be respectively integrated with the input shaft 41 or/and the output shaft 42.

The spur gear 110 is positioned coaxially with the mounting gear 120 and provided at one end portion of a relatively lower end portion of the mounting gear 120. The spur gear 110 may be positioned in the height direction of the center shaft 113 while corresponding to the position of the gear 41a of the input shaft 41. The spur gear 110 includes at least two holes 111 configured to be symmetric to each other with respect to the center shaft 113. In an exemplary embodiment of the present disclosure, the independent steering system of the present disclosure includes the holes 111 formed radially to include an angle of 90 degrees with respect to each other based on the center shaft 113.

Figure 3A:
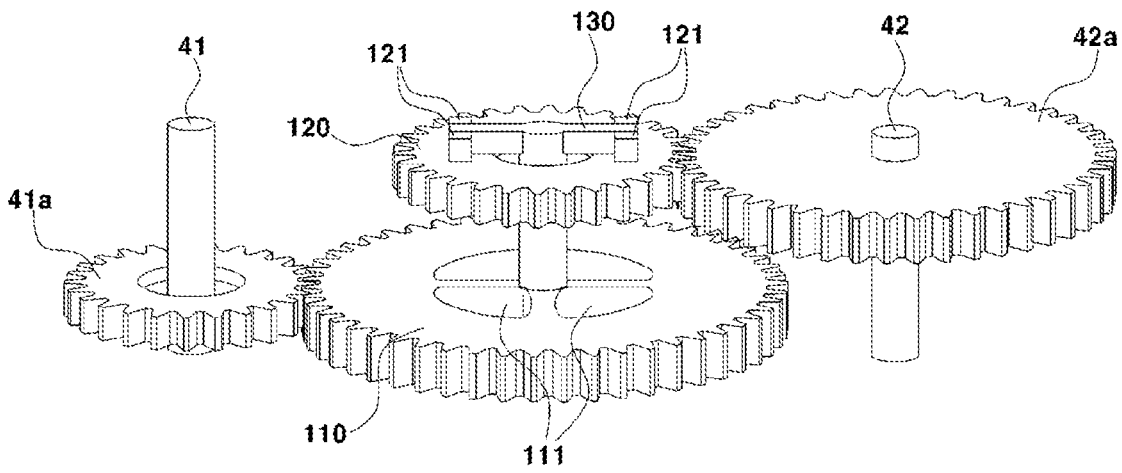
FIG. 3A is a view exemplarily illustrating a coupling structure of a spur gear including a rod portion according to the exemplary embodiment of the present disclosure.
Figure 3B:
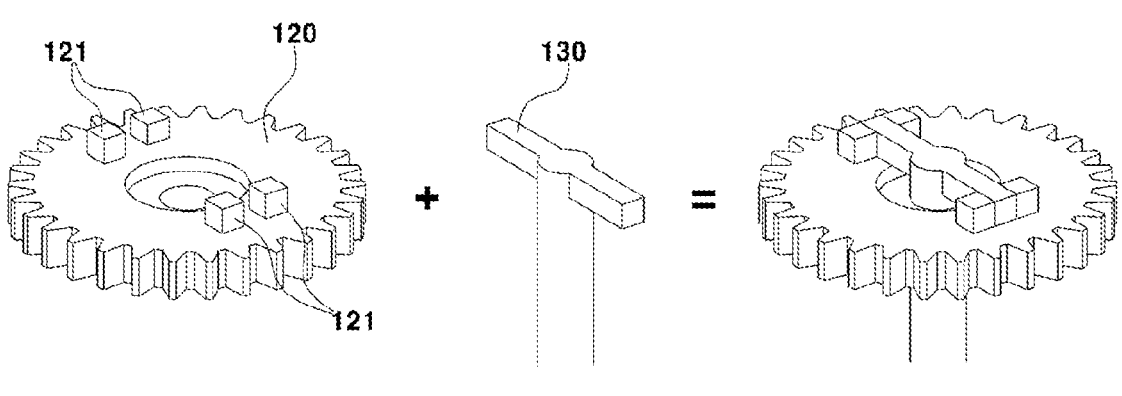
FIG. 3B is a configuration view of the spur gear including the rod portion according to the exemplary embodiment of the present disclosure.

FIG. 3A and FIG. 3B are configuration views exemplarily illustrating the mounting gear 120 including a rod portion 130 according to the exemplary embodiment of the present disclosure.

As illustrated, the gear unit 100 includes the spur gear 110 provided at the position corresponding to the gear 41a of the input shaft 41, and the mounting gear 120 gear-engaged to the gear 42a of the output shaft 42. The mounting gear 120 is provided inside the speed reducer 40 and configured to rotate about the center shaft 113. The rod portion 130 is provided at the position facing one surface of the mounting gear 120 and extends toward two opposite sides symmetric with respect to the center shaft 113. The rod portion 130 extends from the center shaft 113 toward the two opposite surfaces by the same length and is positioned to adjoin one side surface of the spur gear 110.

Moreover, stoppers 121 are provided on one side surface of the mounting gear 120, and two opposite end portions of the rod portion 130 are positioned on the stoppers 121. The stoppers 121 are configured to surround two opposite surfaces of end portions of the rod portion 130, and the stoppers 121 protrude from one side surface of the mounting gear 120. Moreover, the stopper includes two protruding portions provided adjacent to lateral surfaces of the end portion of the rod portion 130 to surround the two opposite surfaces of the rod portion 130. That is, the stopper 121 positioned at one end portion of the rod portion 130 includes the two protruding portions positioned to adjoin the two opposite surfaces of the end portion of the rod portion 130. Furthermore, the stopper 121 positioned at the other end portion of the rod portion 130 also includes the two protruding portions configured to fix the rod portion 130 while adjoining the two opposite surfaces.

Moreover, in an exemplary embodiment of the present disclosure, the rod portion 130 positioned on the center shaft 113 may be fixedly inserted into the center shaft 113. The rod portion 130 is provided in a form of a cantilevered beam extending bidirectionally while adjoining an external surface of the mounting gear 120 based on the center portion.

Figure 4A:
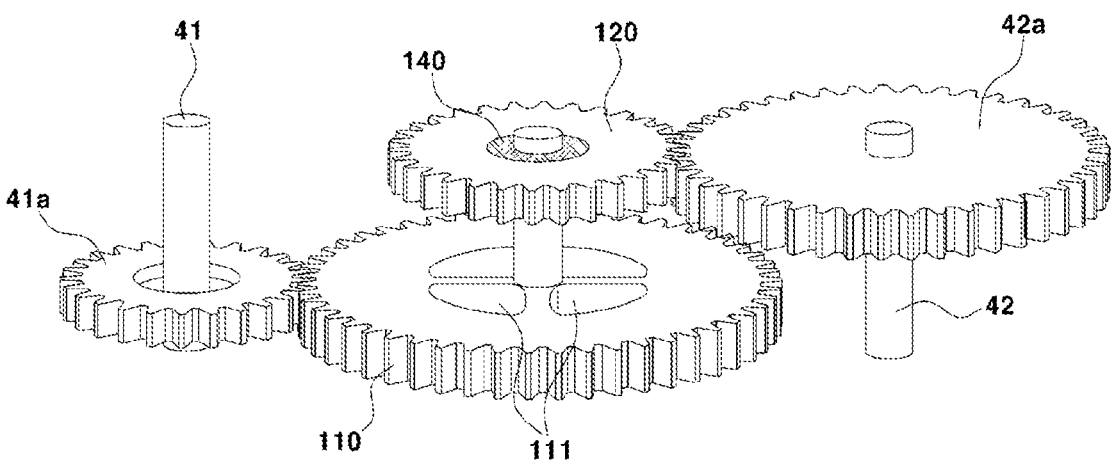
FIG. 4A is a view exemplarily illustrating a coupling structure of a spur gear including a bushing portion according to another exemplary embodiment of the present disclosure.
Figure 4B:
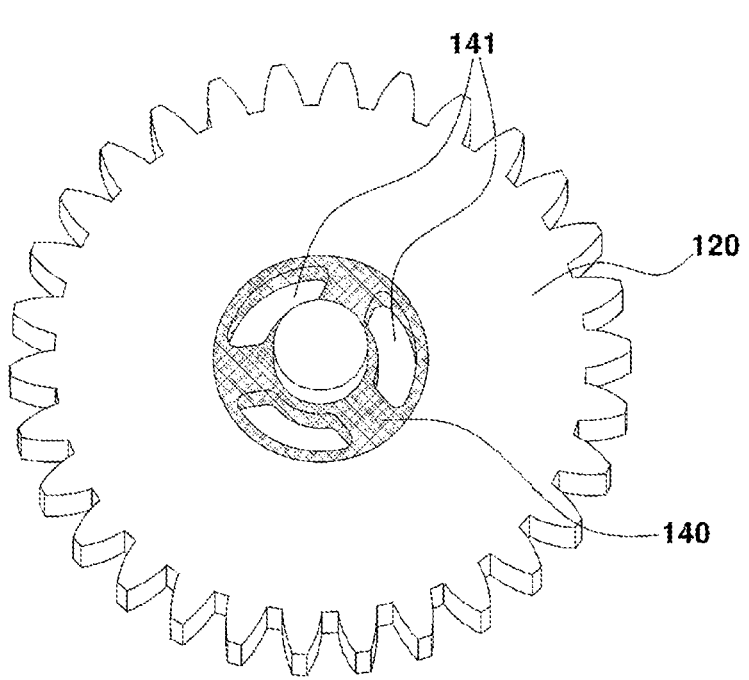
FIG. 4B is a configuration view of the spur gear including the bushing portion according to another exemplary embodiment of the present disclosure.

FIG. 4A and FIG. 4B illustrate a bushing portion 140 positioned on the center shaft 113 of the mounting gear 120 according to another exemplary embodiment of the present disclosure.

The bushing portion 140 is positioned outside the center shaft 113 of the mounting gear 120 and adjoins an internal peripheral surface of the mounting gear 120. The bushing portion 140 extends radially from the center shaft 113 and includes at least one bushing hole 141 formed in an extension direction of the bushing portion 140.

Moreover, the bushing portion 140 may be made of a rubber material including high hardness. A polymer elastomer may be selected from various types of thermoplastic materials such as urethane rubber or polyester rubber including comparatively high hardness, and the thermosetting material may be natural rubber or a combination of various types of synthetic rubber.

The mounting gear 120 including the bushing portion 140 includes a relatively smaller rotation angle according to the rotation of the input shaft 41 than the mounting gear 120 that does not include the bushing portion 140.

Therefore, the mounting gear 120 including the bushing portion 140 is minutely deformed. Therefore, the rotation angle of the output shaft 42 is relatively smaller than that of the output shaft 42 of the speed reducer that does not include the bushing portion 140.

As described above, in another exemplary embodiment of the present disclosure, the minute deformation is made by the bushing portion 140, which is positioned on the center shaft 113 of the mounting gear 120, and the bushing hole 141 positioned on the bushing portion 140. Therefore, the rotation amount of the output shaft 42 decreases even when the same power is applied through the input shaft 41.

Figure 5A:
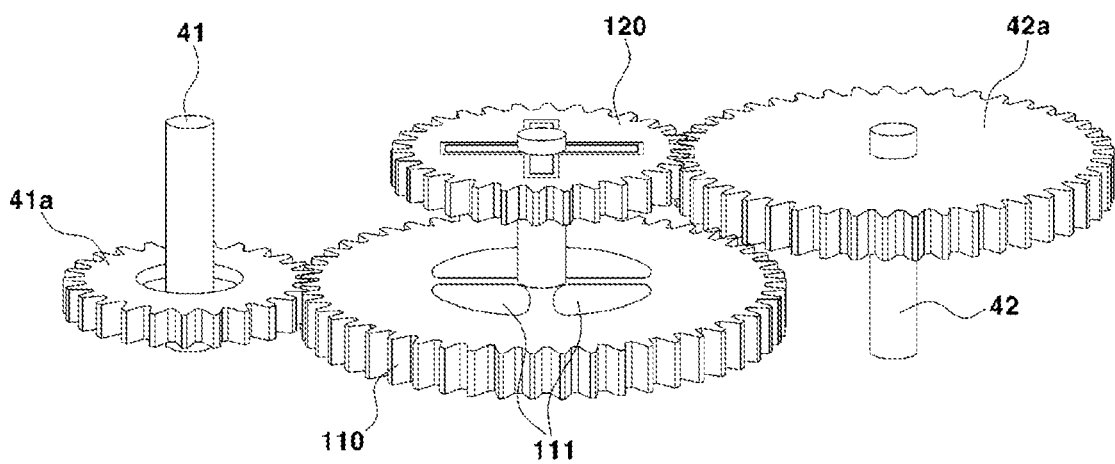
FIG. 5A is a view exemplarily illustrating a coupling structure of a spur gear including a shaft according to various exemplary embodiments of the present disclosure.
Figure 5B:
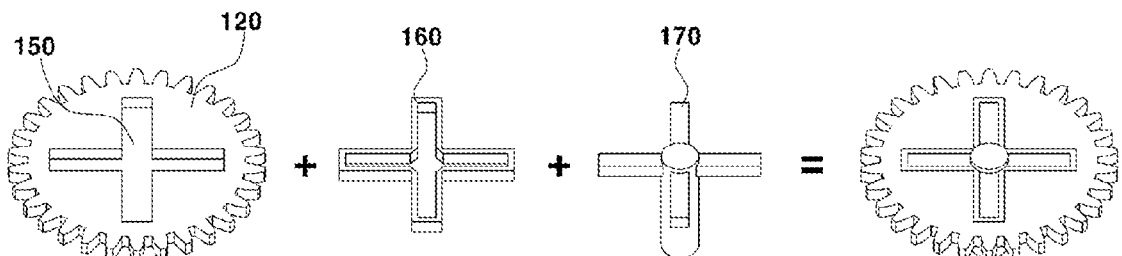
FIG. 5B is a configuration view of the spur gear including the shaft according to various exemplary embodiments of the present disclosure.

FIG. 5A and FIG. 5B illustrate a configuration of the mounting gear 120 including a rubber gasket 160 according to another exemplary embodiments of the present disclosure.

The mounting gear 120 gear-coupled to the output shaft 42 may include the shaft 170 positioned on the center shaft 113 of the mounting gear 120. The shaft 170 is inserted into the center shaft 113 extending symmetrically and bidirectionally from the center shaft 113. In the exemplary embodiment of the present disclosure, the shaft 170 includes at least two or more extension portions. In the exemplary embodiment of the present disclosure, the shaft 170 of the present disclosure may include four extension portions disposed at an angle of 90 degrees with respect to one another, and the shaft 170 is configured to be accommodated in a gasket hole 150 formed in the mounting gear 120.

Moreover, the gasket hole 150 formed in the mounting gear 120 includes the rubber gasket 160 positioned between the shaft 170 and the gasket hole 150. Therefore, in case that the spur gear 110 is rotated by the driving power of the input shaft 41, the mounting gear 120 positioned coaxially with the spur gear 110 rotates integrally with the center shaft 113 of the spur gear 110 so that the rubber gasket 160 positioned inside the gasket hole 150 is deformed in accordance with the rotation of the shaft 170.

As described above, the rubber gasket 160 is minutely deformed in accordance with the rotation of the shaft 170 of the spur gear 110 including the rubber gasket 160 so that the rotation amount of the spur gear 110 relatively decreases. The rotation angle of the output shaft 42 decreases in accordance with the minute deformation.

That is, the speed reducer 40 according to the exemplary embodiment of the present disclosure including the shaft 170 and the rubber gasket 160 may be minutely deformed.

In the case of the independent steering system including the speed reducer 40, the steering motion of the vehicle may be applied in accordance with the understeering characteristics according to the steering angle input.

Figure 6:
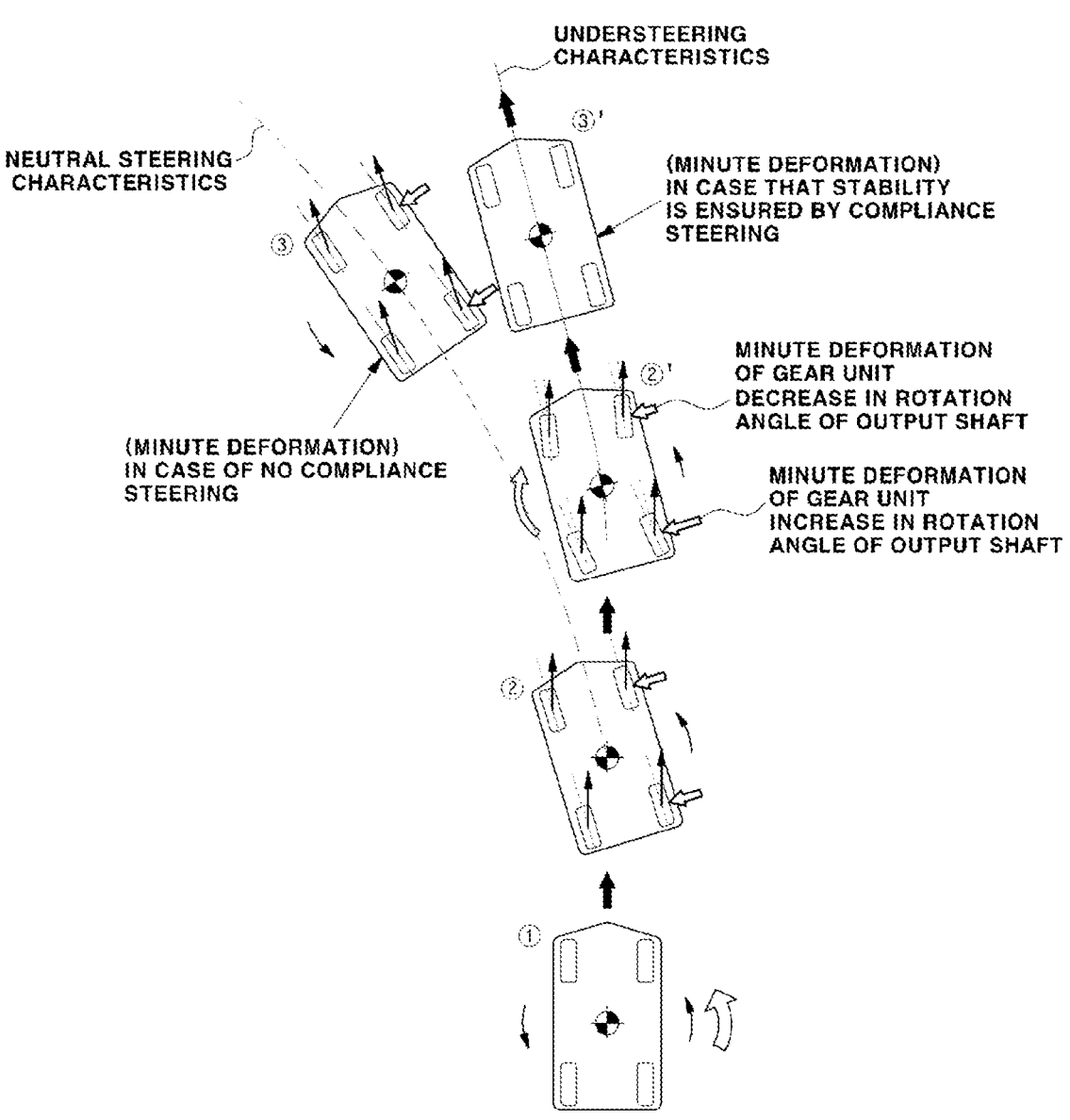
FIG. 6 is a view exemplarily illustrating an understeering motion under a turning environment of a symmetric vehicle according to the exemplary embodiment of the present disclosure.

FIG. 6 illustrates a steering environment that changes to the understeering characteristics of the vehicle including the neutral steering characteristics in case that the speed reducer is used, which applies the minute deformation to the independent steering module positioned at the front end portion of the vehicle according to the exemplary embodiment of the present disclosure.

In the exemplary embodiment of the present disclosure, the vehicle is a vehicle which is symmetric in the leftward/rightward direction and the forward/rearward direction and configured so that a gravity center is positioned at a center portion of the vehicle. The vehicle includes the neutral steering characteristics in case that the minute deformation of the gear unit 100 of the present disclosure is not applied.

However, in case that the minute deformation of the gear unit 100 is applied through the speed reducer of the present disclosure, compliance steering occurs in response to the steering input. Therefore, the steering operation is performed so that the vehicle includes the understeering characteristics.

In the exemplary embodiment of the present disclosure, the gear unit 100, which forms the speed reducer of the independent steering system positioned at the front end portion of the vehicle, may include the mounting gear including at least one of the rod portion 130, the bushing portion 140, and the rubber gasket 160. Selectively, the gear unit 100 may include the spur gear 110 including the plurality of holes 111. Therefore, the speed reducer positioned at the front end portion of the vehicle causes the minute deformation of the gear unit 100 in response to the power applied to the input shaft 41. Therefore, the steering angle output is performed so that the rotation angle of the output shaft 42 relatively decreases.

The foregoing detailed description illustrates the present disclosure. Furthermore, the foregoing description merely shows and describes the exemplary embodiments of the present disclosure, and the present disclosure may be used in various other combinations, modifications, and environments. That is, alterations or modifications may be made within the scope of the concept of the present disclosure included in the present specification, the scope equivalent to the described disclosure, and/or the scope of the technology or knowledge in the art. The disclosed exemplary embodiments are provided to explain the best state for implementing the technical spirit the present disclosure, and various modifications required for the predetermined fields of application and the use of the present disclosure may be made. Thus, the detailed description of the present disclosure is not intended to limit the present disclosure to the disclosed exemplary embodiments of the present disclosure. Moreover, the appended claims should be construed to include other embodiments.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A speed reducer comprising:
an input shaft configured to receive power from a drive portion;
a gear unit fastened to the input shaft to receive the power from the drive portion through the input shaft; and
an output shaft coupled to the gear unit and configured to transmit driving power,
wherein the gear unit includes:
a spur gear coupled to the input shaft; and
a mounting gear positioned coaxially with the spur gear and coupled to the output shaft, and
wherein a rotation angle of the output shaft is decreased by minute deformation of the gear unit.

2. The speed reducer of claim 1, wherein the spur gear includes at least two holes symmetric with respect to a center shaft connecting the spur gear and the mounting gear.

3. The speed reducer of claim 1, further including:
a rod portion fastened to a center shaft of the mounting gear, wherein the center shaft connects the spur gear and the mounting gear; and
stoppers positioned on a surface of the mounting gear so that first and second opposite end portions of the rod portion are fastened to the stoppers.

4. The speed reducer of claim 3, wherein the rod portion extends from the center shaft of the mounting gear in a radial direction of the mounting gear.

5. The speed reducer of claim 1, further including:
a bushing portion including an internal side fixed to a center shaft of the mounting gear, and an external side configured to adjoin an internal peripheral surface of the mounting gear, wherein the center shaft connects the spur gear and the mounting gear.

6. The speed reducer of claim 5, wherein the bushing portion is made of a high-hardness rubber material.

7. The speed reducer of claim 5, wherein the bushing portion includes one or more bushing holes provided at a same interval based on the center shaft.

8. The speed reducer of claim 1, wherein the mounting gear further includes:
a gasket hole formed in the mounting gear in two or more directions symmetric with respect to a center shaft of the mounting gear, wherein the center shaft connects the spur gear and the mounting gear;
a rubber gasket positioned in the gasket hole; and
a shaft fixed to the center shaft of the mounting gear and including an extension portion corresponding to the gasket hole.

9. The speed reducer of claim 8, wherein the gasket hole extends from the center shaft of the mounting gear in a radial direction of the mounting gear.

10. An independent steering system comprising:
an upper arm including one end portion fastened to a vehicle body;
a knuckle unit fastened to the upper arm;
a steering input portion configured to input a steering angle of the knuckle unit; and
a speed reducer fastened to the upper arm and positioned between the steering input portion and the knuckle unit,
wherein the speed reducer includes:
an input shaft configured to receive power of the steering input portion;
a gear unit including a spur gear coupled to the input shaft, and a mounting gear positioned coaxially with the spur gear and coupled to an output shaft; and
the output shaft configured to transmit driving power, and
wherein a rotation angle of the output shaft is decreased by minute deformation of the gear unit.

11. The independent steering system of claim 10, wherein the spur gear includes at least two holes symmetric with respect to a center shaft connecting the spur gear and the mounting gear.

12. The independent steering system of claim 10, further including:
a rod portion fastened to a center shaft of the mounting gear, wherein the center shaft connects the spur gear and the mounting gear; and
stoppers positioned on a surface of the mounting gear so that first and second opposite end portions of the rod portion are fastened to the stoppers.

13. The independent steering system of claim 12, wherein the rod portion extends from the center shaft of the mounting gear in a radial direction of the mounting gear.

14. The independent steering system of claim 10, further including:
a bushing portion including an internal side fixed to a center shaft of the mounting gear, and an external side configured to adjoin an internal peripheral surface of the mounting gear, wherein the center shaft connects the spur gear and the mounting gear.

15. The independent steering system of claim 14, wherein the bushing portion is made of a high-hardness rubber material.

16. The independent steering system of claim 14, wherein the bushing portion includes one or more bushing holes provided at a same interval based on the center shaft.

17. The independent steering system of claim 10, wherein the mounting gear further includes:

a gasket hole formed in the mounting gear in two or more directions symmetric with respect to a center shaft of the mounting gear, wherein the center shaft connects the spur gear and the mounting gear;

a rubber gasket positioned in the gasket hole; and a shaft fixed to the center shaft of the mounting gear and including an extension portion corresponding to the gasket hole.

18. The independent steering system of claim 17, wherein the gasket hole extends from the center shaft of the mounting gear in a radial direction of the mounting gear.

19. The independent steering system of claim 17, wherein the shaft includes at least two extension portions symmetric with respect to the center shaft of the mounting gear.

\* \* \* \* \*